Patented Oct. 27, 1942

2,300,006

UNITED STATES PATENT OFFICE 2,300,006

(DI-ARYL) BORATES

Ralph F. Prescott, Robert C. Dosser, and John J. Sculati, Midland, Mich., assignors to The Dow Chemical Company, Midland, Mich., a corporation of Michigan No Drawing. Application September 16, 1940, Serial No. 356,986

7 Claims. (Cl. 260—462)

This invention concerns a novel group of aromatic borates having the general formula

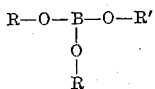

wherein R represents an aromatic radical and R' represents a diaryl radical of the benzene series. These compounds are viscous liquids, some of which solidify on standing. They are substantially odorless and colorless, somewhat soluble in many common organic solvents, and decompose on contact with water. They are useful in the preparation of fungicidal and germicidal compositions. A particular application consists of a substantially non-aqueous solution of the borate which may be diluted with water to obtain relatively fine dispersions of the particular phenols concerned in a dilute solution of boric acid.

The term "diaryl" as herein employed refers to the ortho-, meta-, and para-phenyl-phenyl radicals as derived from the phenyl-phenols, and to the analogues and homologues thereof, wherein one or both of the benzene nuclei is substituted by relatively inert groupings such as alkyl, halogen, cycloalkyl, aralkyl, alkoxy, and the like. The term is not to be construed as including naphthyl or other condensed polynuclear radicals.

The new compounds are prepared by reacting a phenyl-phenol or phenol mixture comprising a phenyl-phenol with boric acid, preferably in a media consisting of a water-immiscible organic solvent. In carrying out the reaction, the phenol and boric acid are dispersed in the solvent and the mixture heated. The reaction temperature is preferably between about 90° and 180° C., although somewhat higher or lower temperatures may be employed, depending upon the particular solvent or phenol employed. Reaction is conveniently carried out at the boiling temperature of the mixture. Water is formed by the reaction of the phenol with the boric acid and is removed from the reaction zone along with a portion of the organic solvent as a steam distillate. While any suitable proportions of reactants may be employed, from about 2 to 4 molecular equivalents of the phenol for each molecular equivalent of boric acid has been found to give the desired compounds in good yield. The amount of water-immiscible organic solvent employed is not critical provided only that sufficient be maintained in the reaction zone to be steam-distilled along with the water formed. We generally employ sufficient of the solvent so that the phenol is dissolved during reaction and the final product is obtained as a solution. When the reaction is completed, i. e. when water is no longer evolved, the reacted mixture may be fractionally distilled to separate the solvent. The residue from such separation consists essentially of a mixture of organic borates in which the triaromatic borate predominates. This residue may be employed in the preparation of fungicidal and germicidal compositions without further purification, or may be fractionally distilled to separate the triaromatic borate in substantially pure form and to recover unreacted phenolic residues and mono- and di-aromatic borate compounds.

The following examples set forth certain embodiments of the invention but are not to be construed as limiting the same:

Example 1

210 grams (1 mol) of 2-phenyl-4-chloro-phenol, 21 grams (0.33 mol) of boric acid, and 500 milliliters of ethyl-benzene were mixed together and heated to 145° C., the boiling temperature of the mixture. Water was produced in the reaction and was distilled out of the reaction zone along with a portion of the ethyl-benzene as a steam distillate. After 12 hours, the reaction was substantially complete as evidenced by the fact that no further water was produced. The reacted mixture was then cooled to room temperature and fractionally distilled under reduced pressure to recover the ethyl-benzene employed and to separate 101 grams of tri-(2-phenyl-4-chloro-phenyl) borate as a straw-colored liquid boiling at 242°–248° C. at 0.15 inch pressure. This compound is somewhat soluble in many common organic solvents and hydrolyzes readily on contact with water.

Example 2

170 grams (1 mol) of 2-phenyl-phenol, 42 grams (0.67 mol) of boric acid, and 376 grams of ortho-dichloro-benzene were mixed together and heated to the boiling temperature substantially as described in Example 1. When no further water was produced in the reaction, the mixture was cooled and fractionally distilled under reduced pressure to recover the ortho-dichloro-benzene and to separate out 122.5 grams of a tri-(2-phenyl-phenyl) borate product as a thick viscous liquid boiling at 320°–330° C. at 0.3 inch pressure. This compound was soluble in many organic solvents, and, when mixed with water, hydrolyzed to give a fine dispersion of 2-phenylphenol in a boric acid solution. This aqueous product was found valuable as a germicidal solution for household use.

In a similar manner other phenyl-phenols may be reacted with boric acid to obtain compounds analogous to those described above. Representative of such phenols are 4-phenyl-phenol, 2.6-dibromo-4-phenyl-phenol, 2.6-diisopropyl-4-phenyl-phenol, 3-phenyl-phenol, 2-phenyl-4-tertiarybutyl-phenol, 4'-chloro-4-phenyl-phenol, 4-phenylethyl-6-phenyl-phenol, 2-methoxy-4-phenyl-phenol, 4-benzyl-5-phenyl-phenol, 2-cyclohexyl-4-phenyl-phenol, and the like.

While the compounds set forth in the foregoing examples are in each instance triaromatic derivatives of boric acid wherein the three substituting aromatic groups are similar, compounds in which one or two aromatic groups other than phenyl-phenyl groups are embodied may be prepared by reacting mixed phenols with boric acid. For example, such compounds as mono-(4-phenyl-phenyl) di-phenyl borate may be formed by reacting a mixture of 2 molecular equivalents of phenol and 1 molecular equivalent of 4-phenyl-phenol with 1 molecular equivalent of boric acid. Similarly isomeric mixtures of the phenyl-phenols and nuclear-substituted derivatives such as the chloro-phenyl-phenols may be reacted with boric acid to obtain mixed triaryl borates. Such compounds have particular utility where it is desired to obtain germicidal or fungicidal compositions which will be effective against a wide range of organisms, since many phenols are relatively specific in their action.

The present application is a continuation-in-part of our copending applications Serial Numbers 299,698 and 299,699, filed October 16, 1939.

Other modes of applying the principles of our invention may be employed instead of those explained, change being made as regards the materials employed provided the products described by any of the following claims be thereby obtained.

We, therefore, particularly point out and distinctly claim as our invention:

1. A compound having the formula

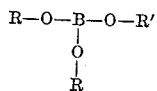

wherein R represents an aromatic radical and R' represents a diaryl radical of the benzene series.

2. A compound having the formula

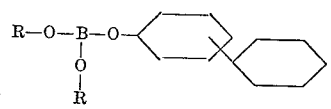

wherein R represents an aromatic radical.

3. A compound having the formula

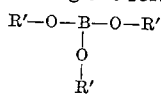

wherein R' represents a diaryl radical of the benzene series.

4. A compound having the formula

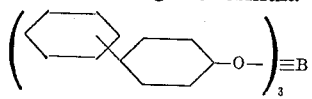

5. A compound having the formula

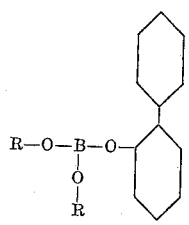

wherein R represents an aromatic radical.

6. Tri-(2-phenyl-phenyl) borate.
7. Tri-(2-phenyl-4-chloro-phenyl) borate.

RALPH F. PRESCOTT.
ROBERT C. DOSSER.
JOHN J. SCULATI.